United States Patent [19]

Ziemek

[11] Patent Number: 4,734,981

[45] Date of Patent: Apr. 5, 1988

[54] METHOD AND APPARATUS FOR MANUFACTURING HOLLOW TUBULAR MEMBERS

[75] Inventor: Gerhard Ziemek, Langenhagen, Fed. Rep. of Germany

[73] Assignee: Kabelmetal Electro GmbH, Hanover, Fed. Rep. of Germany

[21] Appl. No.: 27,437

[22] Filed: Mar. 18, 1987

[30] Foreign Application Priority Data

Apr. 16, 1986 [DE] Fed. Rep. of Germany ....... 3612805

[51] Int. Cl.4 ........................ H01R 43/00; B23P 23/00

[52] U.S. Cl. ........................................ 29/868; 29/825; 29/564.1; 72/283; 228/17.5

[58] Field of Search ....................... 29/825, 564.1, 868; 174/102 D, 102 P; 228/9, 17, 17.5, 148; 72/283

[56] References Cited

U.S. PATENT DOCUMENTS

| | | | |
|---|---|---|---|
| 3,075,484 | 1/1963 | Benteler | 228/17.5 X |
| 3,131,803 | 5/1964 | Hill et al. | 72/283 |
| 3,243,986 | 4/1966 | Douthett et al. | 72/283 |
| 3,271,987 | 9/1966 | Douthett et al. | 72/283 |
| 3,332,138 | 7/1967 | Garner | 29/825 X |
| 3,737,997 | 6/1973 | Davis | 29/825 |
| 3,812,702 | 5/1974 | Benteler et al. | 72/283 |
| 3,874,076 | 4/1975 | Tsukamoto et al. | 29/564.1 X |
| 4,196,607 | 4/1980 | Youtsey et al. | 72/283 X |

*Primary Examiner*—Howard N. Goldberg
*Assistant Examiner*—Carl J. Arbes
*Attorney, Agent, or Firm*—Marn & Jangarathis

[57] ABSTRACT

There is disclosed a method and apparatus for adjusting the thickness of a hollow tubular member to provide a cross-section of constant area, such adjustment being inversely dependent upon detected increases or decreases in the thickness of the metal strip. The method and apparatus provide for the formation and welding of a metal strip into a hollow tubular member; the application of longitudinally directed, braking or pushing forces to the hollow tubular member; and then the continuous reduction of the hollow tubular member to achieve a cross-section of constant area.

13 Claims, 1 Drawing Sheet

METHOD AND APPARATUS FOR MANUFACTURING HOLLOW TUBULAR MEMBERS

The invention relates to method and apparatus for manufacturing a hollow tubular member whose thickness is adjusted to achieve a cross-section of constant volume. Further, the invention relates to such a hollow tubular member formed as a metalic sheath around a cable core.

BACKGROUND OF THE INVENTION

It is priorly known to manufacture hollow tubular members (for example, wave guides and cable sheaths) by the steps of continuously drawing a metal strip in a longitudinal direction through a plurality of forming rolls to form a hollow tubular member, and then continuously welding the longitudinal abutting edges of the hollow tubular member. Further, with respect to cable sheath, it is known to form the metal strip around a cable core prior to the step of continuously welding the longitudinal abutting edges of the sheath.

Often wave guides and cable sheaths manufactured in accordance with the priorly known method and apparatus have been found to have deleterious deviations in their thickness along their longitudinal axes. In the main, such deviations were reflections of deviations in thickness of the metal strip employed. Since it was technically impossible to insist upon a supply of metal strip of constant thickness, there was a need for avoiding such deviation reflections.

As to cable sheaths for submarine cables there is a requirement that the cable sheaths have a cross-section of constant area, and that the cable sheath and the cable core be tangentially and longitudinally anchored to each other so as to present an extended unitary structure. Submarine cables referred to herein are of the type that may include a copper sheath, and a cable core comprised of a plurality of electrical and optical conductors having a plurality of steel wires stranded concentrically around them for tension reinforcement.

OBJECTS OF THE INVENTION

An object of the present invention is to provide a novel method and apparatus for adjusting the thickness of a hollow tubular member to achieve a cross-section of constant area.

Another object of the present invention is to provide a novel method and apparatus for forming the aforesaid hollow tubular member as a metalic sheath around a cable core.

Still another object of the present invention is to provide a novel method and apparatus for forming the aforesaid metalic sheath around the cable core so as to provide tangential and longitudinal anchoring between the metalic sheath and the core.

A further object of the present invention is to achieve the aforesaid tangential and longitudinal anchoring by continuously reducing the metalic sheath into engagement with the cable core, while avoiding torsion in the sheath created by such engagement from being transmitted back through the metalic sheath to a position whereat the opposite longitudinal edges of the sheath are being welded to each other.

A still further object of the present invention is to provide a novel method and apparatus for adjusting the thickness of the aforesaid hollow tubular member by applying longitudinally directed braking or pushing forces to the hollow tubular member, without generating torsional forces within the hollow tubular member that would be deleterious to the welding of the longitudinal abutting edges of such member.

SUMMARY OF THE INVENTION

These and other objects of the present invention are achieved by a method and apparatus for adjusting the thickness of a hollow tubular member to provide a cross-section of constant area, such adjustment being inversely dependent upon detected increases or decreases in the thickness of the metal strip from which the hollow tubular member is formed.

The novel method of the present invention comprises the steps of measuring the thickness of the metal strip; drawing and forming the metal strip into a hollow tubular member; and welding the longitudinal abutting edges of the hollow tubular member. Further, such method includes the steps of applying longitudinally directed, braking or pushing forces to the hollow tubular member; while continuously reducing the hollow tubular member, thus producing a cross-section of constant area.

The novel apparatus of the present invention comprises a source of metal strip; a means for continuously drawing the metal strip in a longitudinal direction; a measuring device for measuring the thickness of the metal strip; and forming means and welding means for forming the metal strip into a hollow tubular member and then welding the longitudinal abutting edges thereof. Further, such apparatus includes a capstan means for applying braking or pushing forces to the hollow tubular member; a servo means coupled between the measuring device and the capstan means for controlling the aforesaid braking or pushing forces; and a draw down means for reducing the hollow tubular member to a cross-section of constant area.

BRIEF DESCRIPTION OF THE DRAWINGS

A better understanding of the present invention as well as the objects and advantages thereof will become apparent upon consideration of the following detailed disclosure thereof, especially when taken with the accompanying drawings; wherein:

Referring to FIG. 1, a cable core 1 comprised, for example, of a plurality of electrical and optical conductors longitudinally fed from a supply drum (not shown) toward and into a intermediate position of a plurality of forming rolls 7 positioned within a core sheathing station 3. Simultaneously a copper strip 5 is drawn from a supply roller 4, passed through a decreasing bath 6, and fed into an input side of the plurality of forming rolls 7. The spacial positioning of the forming rolls 7, the curvature of the individual roll, the outer diameter of the cable core 1, and the thickness and width of the copper strip 5 are such as to form the copper strip 5 into a closed tubular sheath 5' concentrically positioned around the cable core 1 prior to the cable core 1 exiting from the output end of the core sheathing station 3. Positioned in the vicinity of the output end of the core sheathing station 3 is a welding station 8 for welding adjacent longitudinal abutting edges of the closed tubular sheath 5' as such edges progressively pass through the welding station. The welding station 8 employs well known argon arc welding procedures conducted in an inert gas environment.

Figures 1, 2, 3, 4:
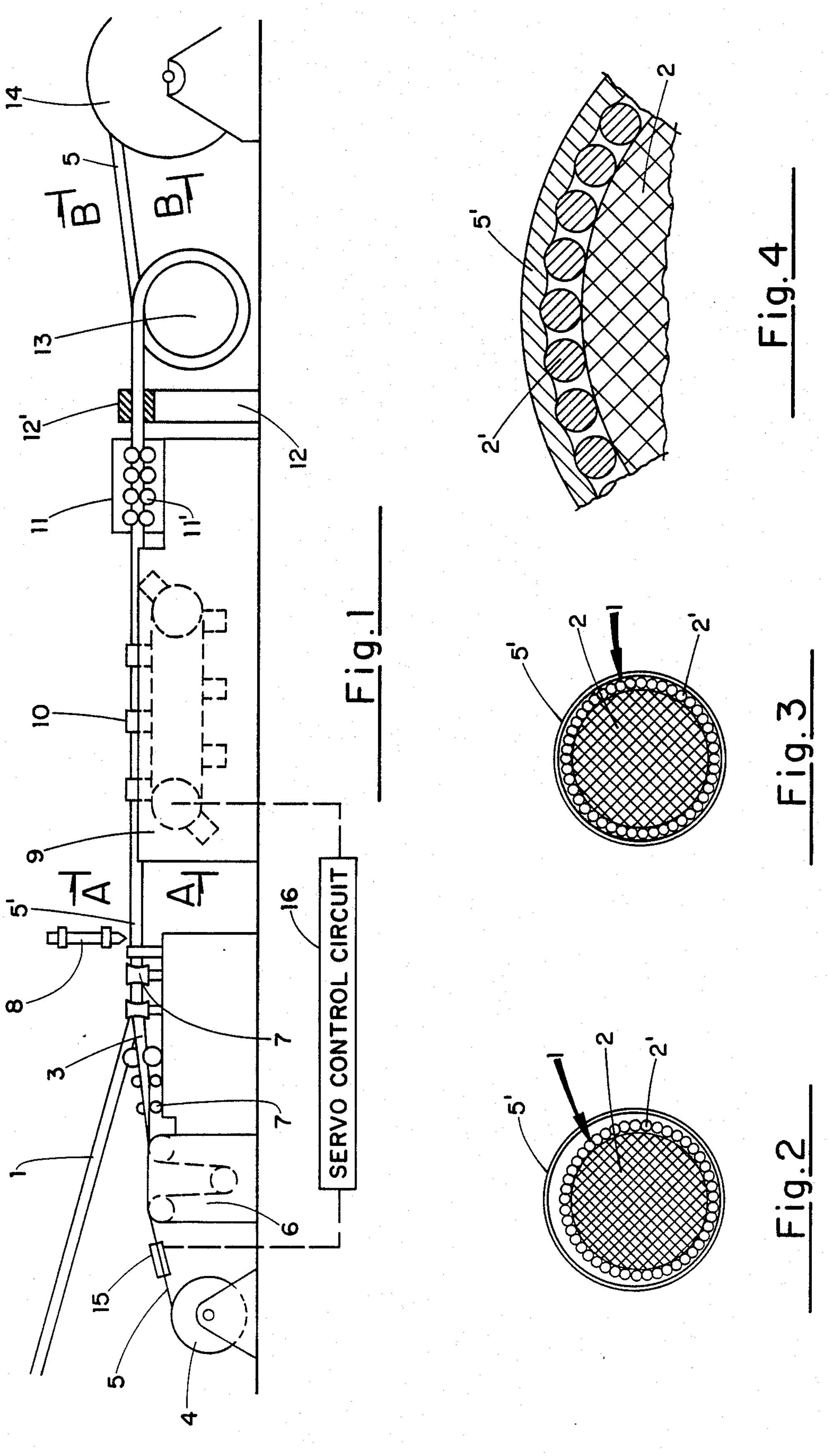
FIG. 1 is a diagrammatic representation of apparatus for manufacturing improved cables.
FIG. 2 is an enlarged cross-sectional view of a partially fabricated cable being manufactured with the apparatus of FIG. 1, as viewed on line A—A.
FIG. 3 is a cross-sectional view of the partially fabricated cable being manufactured with the apparatus of FIG. 1, as viewed on line B—B.
FIG. 4 is an enlarged scale view of a portion of the cross-sectional view of the partially fabricated cable depicted in FIG. 3.

As illustrated by FIG. 2, which is an enlarged cross-sectional view of a partially fabricated cable being manufactured with the apparatus of FIG. 1 as viewed on line A—A, the cable core 1 comprises a plurality of electrical and optical conductors 2 and a plurality of steel wires 2' stranded over the outer surface of the plurality of electrical and optical conductors. At line A—A, the outer diameter of the cable core 1 (i.e., the outer surface of concentrically formed plurality of stranded steel wires 2') is less than the inner circular surface of the closed tubular sheath 5'. Consequently, as the cable core 1 progressively passes through the welding station 8, the adjacent longitudinally edges of the closed tubular sheath 5' which are seam welded in a known manner, are spaced a radial distance from the outer surface of the plurality of stranded steel wires 2'.

Downstream of the welding station 8 are successively: a caterpillar capstan station 9; a turk's head, sheath reducing station 11; a draw down station 12; a cable draw apparatus 13; and a wind-up drum 14.

The capstan station 9 is of a prior known type (see for example, U.S. Pat. Nos. 3,085,729; 3,116,865; and 3,128,930) for periodically gripping and tranversely moving the closed tubular sheath 5' in a longitudinal path. There is included in the capstan station 9 a plurality of gripper assemblies 10 each including a pair of clamping elements (not shown) for engaging and disengaging the longitudinally moving closed tubular sheath 5'. Further, capstan station 9 includes drive apparatus (not shown) for moving each of the gripper assemblies 10 in an elongated endless path. Each of the gripper assemblies 10 periodically engages a portion of the outer circumferential surface of the closed tubular sheath 5' in a manner to avoid crushing of the freshly welded sheath, yet retaining a tight circumferential grip on the sheath so as to prevent slipping or turning of the sheath, as it is drawn from the welding station 8 and longitudinally fed into an input end of a plurality of driven reducing rolls 11' included within the sheath reducing station 11.

The driven reducing rolls 11' are adapted to engage the outer circumferential surface of the closed tubular sheath 5' in a manner to provide reducing forces in a radial direction toward the steel wires 2', and to accurately reduce in a controlled manner the lateral movement of the closed tubular sheath 5' from the output end of the caterpillar capstan 9 to the input side of the draw down station 12. The employment of driven reducing rolls 11' have been found particularly advantageous with regard to the processing of closed tubular sheaths having thin wall thicknesses in the range of 0.4 to 0.8 mm.

The draw down station 12 includes a draw down die 12' through which the close tubular sheath 5' and the cable core 1 (the sheathed cable) are longitudinally drawn, for example, by a wheel capstan 13, and then fed to a take-up reel 14. Further processing of the sheathed cable may comprise the application of a plastic covering for corrosion protection.

The cross-sectional view of the partially fabricated cable as depicted by FIG. 3, and the enlarged scale, partial cross-sectional view depicted by FIG. 4, depict the engagement of the inner surfaces of the closed tubular sheath 5' with the outer surfaces of the plurality of twisted steel wires 2', once such sheath and the core 1 therein have been drawn through draw down station 12. As is clearly discernible from FIG. 4, the closed tubular sheath 5' has a reduced outer circumference, and an inner surface that engages the plurality of steel wires 2' by at least partially penetrating the spaces between adjacent ones of the plurality of the steel wires 2' for achieving a common anchoring of the closed tubular sheath 5' and such steel wires throughout the length of the cable.

Further, in accordance with the instant invention there is achieved a cross-section of constant volume of the closed tubular sheath 5' once it passes through the draw down station 12, notwithstanding tolerable thickness variations in the copper strip 5 being drawn from the supply roller 4. With reference to FIG. 1, there is provided a measuring device 15 positioned upstream of the core sheathing station 3 for detecting fluctuations in the thickness of the copper strip 5. Connected between the measuring device 15 and the caterpillar capstan 9 is a servo control circuit 16 that controls (after a time delay to compensate for the travel time of the copper strip 5 from the measuring device 15 to the caterpillar capstan 9) the longitudinal velocity of the gripper assemblies 10 of the caterpillar capstan 9 to provide an inverse dependency. The servo control circuit 16 provides no speed correction to the caterpillar capstan 9 when the measuring device 15 determines no variance from the nominal thickness of the copper strip 5. Under such condition, the gripper assemblies 10 which are in circumferential engagement with the freshly welded, closed tubular sheath 5', have a longitudinal velocity such as to cause no longitudinal directed pushing or braking force to be applied to the tubular sheath 5'. When the measuring device 16 detects an increase from the nominal thickness of the copper strip 5, the servo control circuit 16 causes a decrease in the longitudinal velocity of the gripper assemblies 10, thus applying a longitudinal directed braking force to the engaged portions of the freshly welded, closed tubular sheath 5'. Conversely, when the measuring device 16 detects a decrease from the nominal thickness of the copper strip 5, the servo control circuit 16 causes an increase in the longitudinal velocity of the gripper assemblies 10, thus applying a longitudinal directed pushing force to the engaged portions of the freshly welded, closed tubular sheath 5'. In all instances, the tight circumferential engagement of the gripper assemblies 10 about spaced longitudinal segments of the tubular sheath 5' assures that the longitudinally directed braking or pushing forces are applied uniformly, thus avoiding the generation of torsional forces within the freshly welded, closed tubular sheath 5'. Further, such tight circumferential engagements prevent torsional forces generated in the freshly welded, closed tubular sheath 5' as it is roll reduced and drawn down onto the steel wires 2', which are longitudinally stranded over the plurality of electrical and optical conductors 2, from being transmitted upstream to the welding station 8 and the core sheathing station 3. It is of particular importance to avoid torsional forces in the copper strip 5 as it is formed into a hollow tube in the core sheathing station 3, since the adjacent longitudinal edges to be welded at the welding station 8 must be accurately positioned and controlled.

In the circumstance of constant cross-sectional area of the closed tubular sheath 5' at the output side of the draw down station 12, the following equation pertains:

$$Ve = \frac{\text{Constant}}{Se\,(De - Se)}$$

wherein

Ve is the velocity of the closed tubular sheath 5';

Se is the wall thickness of such sheath; and

De is the outer diameter of such sheath, all at the input side of the draw down station 12.

Accordingly, for a particular outer diameter De, fluctuations in wall thickness Se are balanced inversely by variations in velocity Ve of the closed tubular sheath 5'.

The longitudinally directed pushing or braking forces per unit of time to compensate for variations in the wall thickness Se are in accord with the following proportional relationship:

$$\frac{P}{t} \propto \frac{\pm \Delta\, Ve\, F\, E}{L};$$

wherein ΔVe is the velocity change from the nominal velocity condition; F is the cross-sectional area of the closed tubular sheath 5'; E is the coefficient of elasticity of the material of which the closed tubular sheath 5' is comprised, in this case copper; and L is the longitudinal distance between the point of application of the pushing or braking forces applied to the closed tubular sheath 5' by the gripper assemblies 10 and the input of the draw down station 12.

While the invention has been described in connection with an exemplary embodiment thereof, it will be understood that many modifications will be apparent to those of ordinary skill in the art and that this application is intended to cover any adaptions or variations thereof. Therefore, it is manifestly intended that the invention be only limited by the claims and equivalents thereof.

What is claimed:

1. Method for adjusting the thickness of a hollow tubular member to achieve a cross-section of constant area, comprising the steps of:
   - continuously measuring the thickness of a metal strip to detect any increase or decrease thereof from a nominal thickness;
   - continuously drawing the metal strip in a longitudinal direction through a forming means to form a hollow tubular member having a first cross-section;
   - continuously welding longitudinal abutting edges of the hollow tubular member;
   - continuously engaging and disengaging longitudinally spaced, circumferential portions of the hollow tubular member, and applying a longitudinally directed, braking force thereto if an increase in the thickness of the metal strip is detected, and applying a longitudinally directed, pushing force thereto if a decrease in the thickness of the metal strip is detected; and
   - continuously reducing the hollow tubular member to provide a second cross-section whose area is constant.

2. Method in accordance with claim 1, further comprising the step of circumferentially supporting and longitudinally driving the hollow tubular member immediately prior to its reduction.

3. Method in accordance with claim 1, wherein said metal strip is formed around a cable core having an outer dimension less than the inner dimension of the hollow tubular member.

4. Method in accordance with claim 3, wherein said step of continuously reducing the hollow tubular member causes its inner surface to penetrate into outer surfaces of the cable core to provide tangential and longitudinal anchoring between the tubular member and the core.

5. Method in accordance with claim 3, wherein the cable core is comprised of a plurality of conductors and a plurality of wires stranded around the conductors, and wherein said step of continuously reducing the hollow tubular member causes its inner surfaces to engage the stranded wires by at least partially penetrating the spaces between adjacent ones of the plurality of the stranded wires for providing tangential and longitudinal anchoring of the tubular member and the core.

6. Method in accordance with claim 1 wherein the longitudinally directed braking or pushing force per unit of time is in proportion to the following:

$$\frac{P}{t} \propto \frac{\pm \Delta\, Ve\, F\, E}{L}$$

wherein ΔVe is the differential in velocity from the nominal velocity; F is the area of the cross-section of the tubular sheath at the output side of the draw down station; E is the coefficient of elasticity of the material of which the tubular sheath is comprised; and L is the shortest distance between the point of application of the braking or pushing force and the point of reduction of outer dimensions of the hollow tubular member.

7. Method in accordance with claim 4, wherein said step of engaging and disengaging longitudinal spaced, circumferential portions of the tubular member includes tightly circumferentially gripping of the tubular member.

8. Apparatus for adjusting the thickness of a hollow tubular member to achieve a cross-section of constant area, comprising
   - a source of metal strip;
   - a means for continuously drawing the metal strip in a longitudinal direction;
   - a measuring means for continuously measuring the thickness of the metal strip to detect an increase or decrease thereof from a nominal thickness;
   - a forming means for continuously forming the metal strip into a hollow tubular member having a first cross-section;
   - a welding means for continuously welding longitudinal abutting edges of the hollow tubular member;
   - a capstan means for continuously engaging and disengaging longitudinally spaced, circumferential portions of the hollow tubular member, and applying a longitudinally directed, braking force thereto if an increase in the thickness of the metal strip is detected, and applying a longitudinally directed, pushing force thereto if a decrease in the thickness of the metal strip is detected, said capstan means including a plurality of gripper assemblies that move in an elongated endless path;
   - a servo means coupled between said measuring means and said capstan means for controlling longitudinal velocity of said gripper assemblies for applying the braking or pushing force to the hollow tubular member;

and a draw down means for reducing the hollow tubular member to provide a second cross-section whose area is constant.

9. Apparatus in accordance with claim 8, further comprising a plurality of driven support rollers adapted to circumferentially engage an outer surface of the hollow tubular member for supporting and directing the longitudinal movement thereof from the output end of said capstan means to an input side of said draw down means.

10. Apparatus in accordance with claim 8, further comprising a source of cable core, said means for continuously drawing the metal strip also drawing the cable core in a longitudinal direction, said forming means continuously forming the metal strip around the cable core.

11. Apparatus in accordance with claim 10, wherein said draw down means reduces the hollow tubular member, causing the inner surface thereof to penetrate into outer surfaces of the cable core to provide tangential and longitudinal anchoring between the tubular member and the core.

12. Apparatus in accordance with claim 10, wherein the cable core is comprised of a plurality of conductors and a plurality of wires stranded over the conductors, and wherein said draw down means reduces the hollow tubular member, causing the inner surface thereof to partially penetrate the spaces between adjacent ones of the plurality of stranded wires for providing tangential and longitudinal anchoring of the tubular member and the stranded wires.

13. Apparatus in accordance with claim 8, wherein each of said gripper assemblies provides a tight circumferential gripping of the tubular member.

* * * * *